(12) United States Patent
Rose et al.

(10) Patent No.: US 6,402,205 B1
(45) Date of Patent: Jun. 11, 2002

(54) FUEL-LINE COUPLING

(75) Inventors: Andreas Rose, Niestetal; Thorsten Otto, Ahnatal; Kurt Apel, Neuenstein, all of (DE)

(73) Assignee: TI Group Automotive Systems, Fuldabruck (DE)

( * ) Notice: Subject to any disclaimer, the term of this patent is extended or adjusted under 35 U.S.C. 154(b) by 0 days.

(21) Appl. No.: 09/946,821

(22) Filed: Sep. 5, 2001

(30) Foreign Application Priority Data

Sep. 20, 2000 (EP) .............................. 00120520

(51) Int. Cl.$^7$ ................................ F16L 39/00
(52) U.S. Cl. ..................... 285/319; 285/54; 285/374; 285/917
(58) Field of Search .................... 285/54, 55, 374, 285/399, 378, 917, 319

(56) References Cited

U.S. PATENT DOCUMENTS

| 1,890,290 | A |   | 2/1932 | Hargreaves |            |
| 5,210,949 | A | * | 5/1993 | Wayne      | ... 30/93  |
| 5,992,895 | A | * | 11/1999 | Steinkamp | ... 285/319 |
| 6,082,779 | A | * | 7/2000 | Lesser et al. | ... 285/319 |

FOREIGN PATENT DOCUMENTS

| DE | 2508298       |   | 4/1975 |
| DE | 3144117 A1    | * | 5/1983 |
| DE | 3936928       |   | 8/1991 |
| EP | 0525600       |   | 3/1992 |

* cited by examiner

Primary Examiner—Anthony Knight
Assistant Examiner—Aaron Dunwoody
(74) Attorney, Agent, or Firm—Herbert Dubno; Andrew M. Wilford

(57) ABSTRACT

A coupling has a plastic socket part having a connection nipple fitted into an end of one of two tubes to be joined and having an outer surface engaging the lining of the one tube, a socket having an inner surface, and a conductive metallic lining layer on and extending between the inner and outer surface. A plastic plug part has a respective connection nipple fitted into an end of the other of the tubes and has an outer surface engaging the lining of the other tube, a plug having an outer surface and fittable in the socket, and a conductive metallic lining layer on and extending between the outer surfaces of the plug part. An electrically conductive seal ring is fixed in the socket and engages the outer surface of the plug part. The parts are made of polyoxymethylene and/or a fiber-reinforced polyamide.

9 Claims, 1 Drawing Sheet

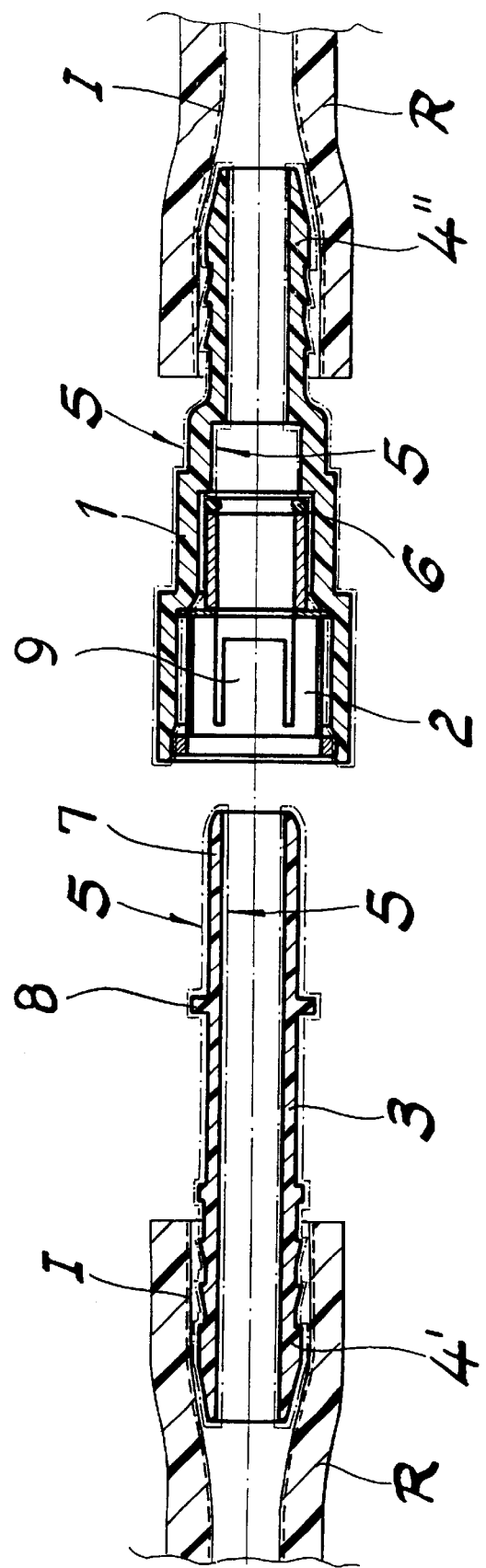

FUEL-LINE COUPLING

FIELD OF THE INVENTION

The present invention relates to a fuel-line coupling. More particularly this invention concerns such a coupling used in electrically conductive plastic fuel lines.

BACKGROUND OF THE INVENTION

It is standard to produce the tubing used as fuel lines by coextrusion of a plurality of layers of different plastics to impart the necessary strength and chemical impermeability to the end product. In order to suppress the static-electric charge that can build up as fuel passes through them, the tubing is typically made to be electrically conductive, normally by providing it with an innermost conductive layer. This layer is grounded in the vehicle or other equipment the line is used in so as to dissipate any such charge.

The couplings provided for such lines normally each comprise a plastic plug part and a plastic socket part that snap into each other. Each part has a connection nipple that is inserted into the respective tubing-section end. For a conductive fuel line it is therefore necessary to make the coupling also conductive. This is typically done by mixing carbon black with the plastic of which the coupling is constructed, producing a fitting that is generally conductive so that the electrical connection is maintained through the coupling.

The problem with this procedure is that the carbon black weakens and embrittles the plastic of the coupling, reducing its strength and shortening its service life. In addition the carbon black is not actually bonded into the fitting so that it can wash or leach out of the surface regions in contact with the passing fuel, making them nonconductive. Finally the carbon inclusions can make the coupling slightly porous, allowing fuel to perfuse through it.

OBJECTS OF THE INVENTION

It is therefore an object of the present invention to provide an improved conductive coupling for a fuel line.

Another object is the provision of such an improved conductive coupling for a fuel line which overcomes the above-given disadvantages, that is which is strong and which maintains good conductivity over a long service life.

SUMMARY OF THE INVENTION

A coupling has according to the invention a plastic socket part having a connection nipple fitted into an end of one of two tubes to be joined and having an outer surface engaging the lining of the one tube, a socket having an inner surface, and a conductive metallic lining layer on and extending between the inner and outer surface. A plastic plug part has a respective connection nipple fitted into an end of the other of the tubes and has an outer surface engaging the lining of the other tube, a plug having an outer surface and fittable in the socket, and a conductive metallic lining layer on and extending between the outer surfaces of the plug part.

With this system the metallic lining layer solves two problems. It first of all forms an excellent electrical connection between the conductive linings of the two tubes being interconnected. In addition it makes the coupling parts wholly impermeable, so that they do not need to be made of a complex layered constructions produced by coextrusion. Such a coupling is much easier and cheaper to make than a metal one, and can even be bonded relatively effectively to the plastic tubes.

According to the invention the respective conductive metallic lines cover all inner and outer surfaces of both parts. The plastic of these parts is thus encapsulated and, effectively, kept out of contact with the volatiles in the fuel.

An electrically conductive seal ring is fixed according to the invention in the socket and engages the outer surface of the plug part. Thus this seal ring can ensure good electrical contact between the plug and socket.

The parts in accordance with the invention are made of polyoxymethylene and/or a fiber-reinforced polyamide. The fibers can be glass and constitute up to 50% by weight of the plastic of the parts. Alternately they can be carbon or steel and constitute up to 30% by weight of the plastic of the parts to generally improve the conductivity, even if the conductive lining layer is absent, for instance, from local wear.

The conductive metallic lining layers are made of nickel, copper, chromium, zinc, tin, or mixtures thereof and are applied in a metallizing, galvanizing, or vacuum-coating process. They have a thickness of up to 50 μm.

BRIEF DESCRIPTION OF TIE DRAWING

The above and other objects, features, and advantages will become more readily apparent from the following description, reference being made to the accompanying drawing whose sole FIGURE is an axial section through a coupling according to the invention.

SPECIFIC DESCRIPTION

As seen in the drawing a pair of fuel-line tubes R having conductive linings I are interconnected by a plastic part 1 having a socket 2 and another plastic part 3 having a plug 7 fittable into the socket 2. The parts 1 and 3 both have standard tubular ridged nipples 4' and 4" that are force-fitted into the ends of the respective tubes R. The plug 7 has a radially outwardly projecting rim 8 that can be snapped behind tabs 9 (one shown) of the socket 2 to releasably secure the two parts 1 and 3 axially together. The illustrated connection is straight, but could as easily be made for an angled connection, for instance by making the part 3 L-shaped for a right-angle or 45° coupling.

According to the invention both parts 1 and 3 have conductive metal lining layers 5 that completely cover all their surfaces, outer and inner. Thus the layers 5 are in good electrical contact with the linings I of the tubes R, as well as with each other, either directly where the plug 7 fits into the socket 2 or via a conductive O-ring 6 fixed in the socket 2.

The plastic of the parts 1 and 3 can be polyoxymethylene or a polyamide, for instance Nylon 12. The plastic can be reinforced up to 50% by weight with glass fibers or up to 30% by weight with steel or carbon fibers.

The conductive layer 5 can be of nickel, copper, chromium, zinc, and/or tin. It can be made by chemical metallizing, galvanizing, or vacuum plating. It has a thickness of at most 50 μm.

We claim:

1. In combination with a pair of fuel-line tubes having conductive linings, a coupling comprising:

a plastic socket part having
   a connection nipple fitted into an end of one of the tubes and having an outer surface engaging the lining of the one tube,
   a socket having an inner surface, and
   a conductive metallic lining layer on and extending between the inner and outer surface; and a plastic plug part having a respective connection nipple fitted into an end of the other of the tubes and having an outer surface engaging the lining of the other tube, a plug having an outer surface and fittable in the socket, and a conductive metallic lining layer on and extending between the outer surfaces of the plug part.

2. The fuel-line coupling defined in claim 1 wherein the respective conductive metallic lines cover all inner and outer surfaces of both parts.

3. The fuel-line coupling defined in claim 1, further comprising an electrically conductive seal ring fixed in the socket and engaging the outer surface of the plug part.

4. The fuel-line coupling defined in claim 1 wherein the parts are made of polyoxymethylene.

5. The fuel-line coupling defined in claim 1 wherein the parts are made of a fiber-reinforced polyamide.

6. The fuel-line coupling defined in claim 5 wherein the fibers are glass and constitute up to 50% by weight of the plastic of the parts.

7. The fuel-line coupling defined in claim 5 wherein the fibers are of carbon or steel and constitute up to 30% by weight of the plastic of the parts.

8. The fuel-line coupling defined in claim 1 wherein the conductive metallic lining layers are made of nickel, copper, chromium, zinc, tin, or mixtures thereof and are applied in a metallizing, galvanizing, or vacuum-coating process.

9. The fuel-line coupling defined in claim 1 wherein the conductive metallic lining layers have a thickness of up to 50 $\mu$m.

* * * * *